Figure 1:
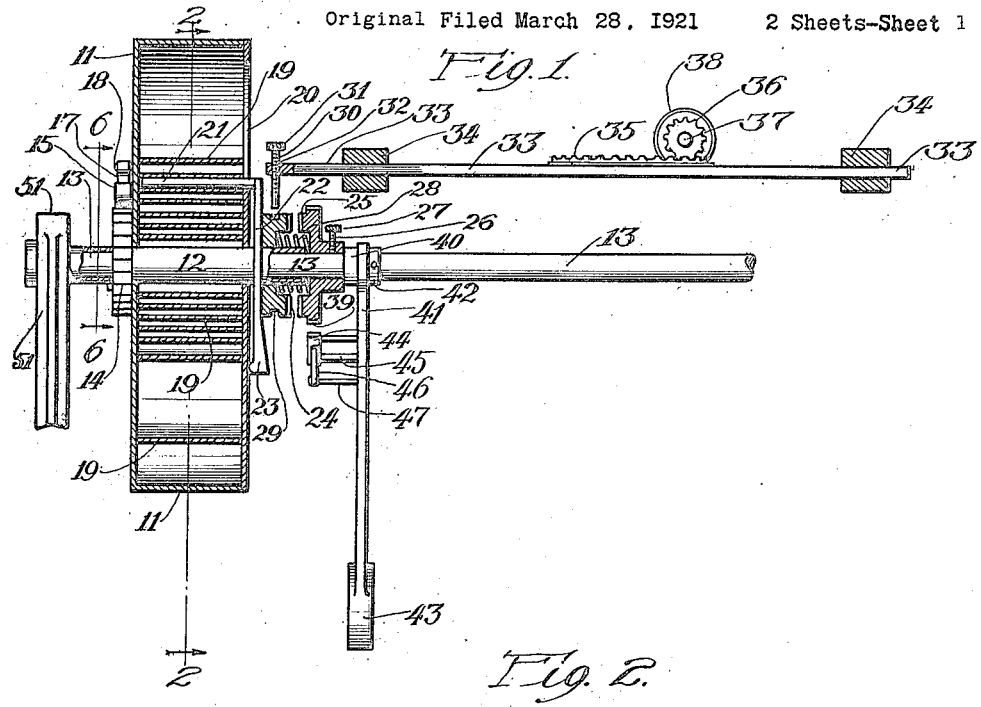

June 12, 1923.

C. H. GILL

SPRING WINDING MECHANISM

Original Filed March 28, 1921    2 Sheets-Sheet 1

1,458,333

Witness:  
Stephen F. Kebna

Inventor:  
Charles H. Gill

June 12, 1923.
C. H. GILL
1,458,333
SPRING WINDING MECHANISM
Original Filed March 28, 1921
2 Sheets-Sheet 2
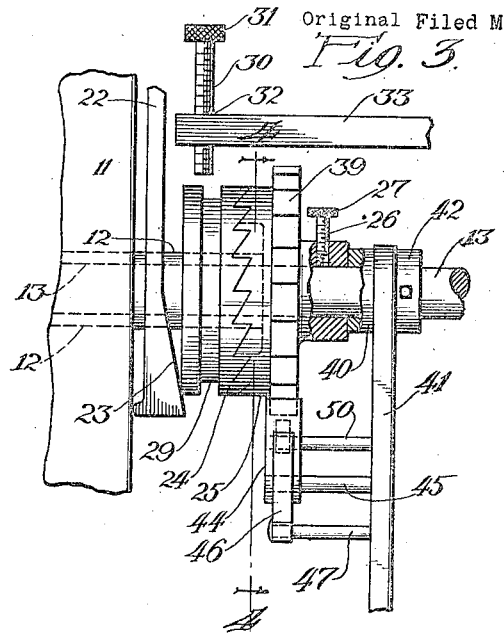
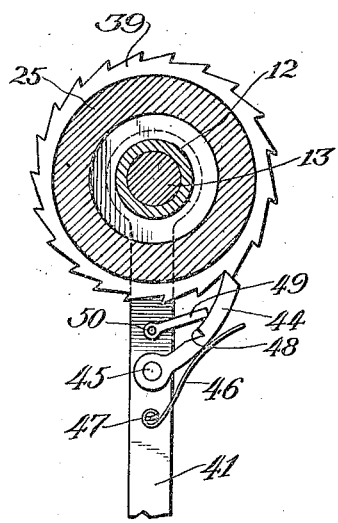
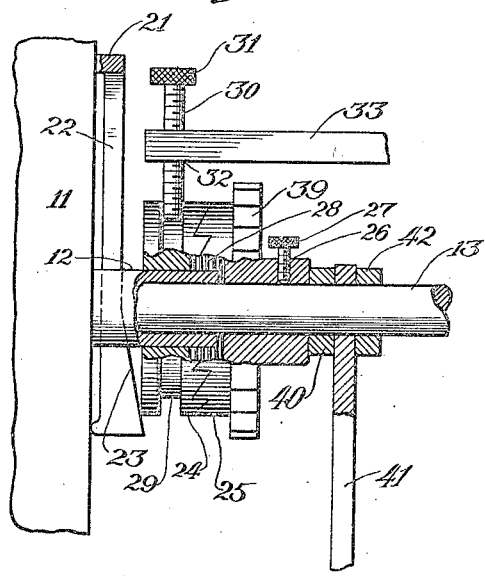
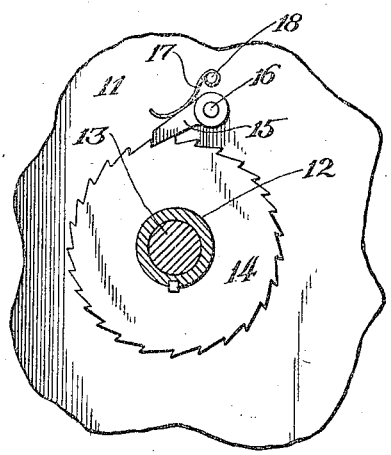
Witness:
Stephen F. Kebre
Inventor.
Charles H Gill Patented June 12, 1923.

1,458,333

UNITED STATES PATENT OFFICE.

CHARLES H. GILL, OF CHICAGO, ILLINOIS, ASSIGNOR OF ONE FIVE-THOUSANDTH TO LOUIS J. BERGAMO, ONE FIVE-THOUSANDTH TO ANDREW C. ARENTZ, ONE HUNDRED FIVE-THOUSANDTHS TO MACK H. HIGGINBOTTOM, ONE FIVE-THOUSANDTH TO EDWARD DOSSMANN, ONE FIVE-THOUSANDTH TO CAROLINA DOSSMANN, AND ONE FIVE-THOUSANDTH TO HENRY SAXE, ALL OF CHICAGO, ILLINOIS.

SPRING-WINDING MECHANISM.

Application filed March 28, 1921, Serial No. 456,194. Renewed December 6, 1922.

*To all whom it may concern:*

Be it known that I, CHARLES H. GILL, a citizen of the United States, residing at Chicago, in the county of Cook and State of Illinois, have invented a new and useful Spring-Winding Mechanism, of which the following is a specification.

My invention relates to automatically acting means for maintaining the tension of a coiled spring within such limits as to render the said spring always operative to drive mechanism and to rewind the said spring whenever it becomes uncoiled or untensioned to a given degree. This invention is an improvement, or further development, of my invention of automatic winding mechanism for springs, patented March 2nd, 1920, No. 1,332,870.

The objects of my invention are, first, to provide a clutch member adapted to wind a coiled spring when said clutch member is rotated in one direction; second, to provide means for preventing rotation of the said clutch member in other than the said direction; third, to provide automatically operating means for moving the said clutch member into engagement with a second clutch member whenever the said coiled spring becomes unwound to a given extent and to move the same out of such engagement whenever the said coiled spring becomes wound to a given extent; fourth, to provide means for securing the said second clutch member to a shaft in such manner that when said shaft is rotated in the proper direction the said second clutch member will be capable of rotating the said first named clutch member while said clutch members are engaged; fifth, to provide means whereby the movement into engagement of one of said clutch members with the other is adapted to cause the starting of a motor adapted to rotate the said shaft; sixth, to provide means for rendering the said last named means inoperative at will; seventh, to provide means for disengaging the said second clutch member from the said shaft at will; eighth, to provide pendulum means for rotating the said second clutch member in winding direction; and, ninth, to provide means for rendering said pendulum means inoperative at will. In short, it is my object to provide a spring adapted to be wound either by continuous rotation of a driven shaft, by a shaft caused to rotate only during the periods of such winding, or by the swinging of a pendulum under the influence of inertia or gravity, with means for changing from one of such modes of operation to the other at the will of the user, and to cease to be wound by any or either of such means whenever the said spring attains a given degree of tension.

I attain these objects by the mechanism illustrated in the accompanying drawings, in which—

Figure 2:
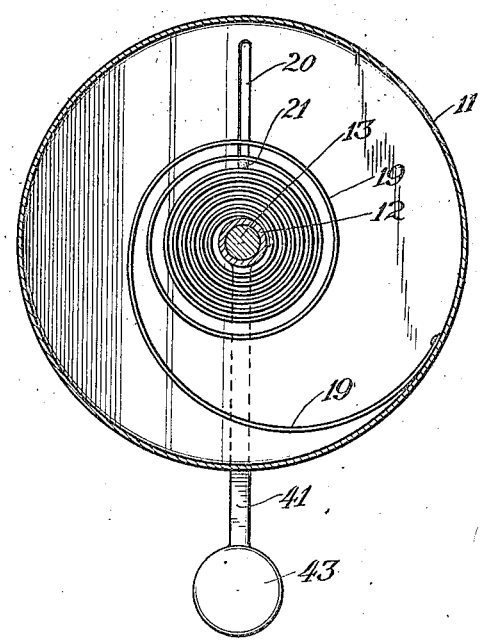

Figure 1 is a side elevation and partly sectional view of the entire mechanism, the same being here illustrated as set for operation by a continuous rotation of the shaft; Figure 2 is a section taken on the line 2—2 of Figure 1; Figure 3 is an enlarged side elevational and partly sectional detail view showing the mechanism set for operation by the pendulum and with the clutch members engaged; Figure 4 is a section taken on the line 4—4 of Figure 3; Figure 5 is a similar view to Figure 3 but showing the mechanism set for actuation by a motor adapted to rotate the shaft only when the clutch members are engaged; and Figure 6 is an enlarged sectional detail taken on the line 6—6 of Figure 1.

Similar numerals refer to similar parts throughout the several views.

11 designates a spring barrel mounted for free rotation upon a sleeve 12 enveloping a shaft 13 which is freely rotatable independently of the sleeve 12. A ratchet wheel 14 is fixed upon the sleeve 12 and prevents the spring barrel 11 from moving longitudinally upon the sleeve 12 in one direction. The ratchet wheel 14 is engaged by a pawl 15 which is pivotally mounted upon the spring barrel 11 by means of a pin 16 and pressed into engagement with the ratchet wheel 14 yieldably by the spring 17 secured to the pin 18 fixed in the spring barrel 11.

One end of a coil spring 19 is secured to the sleeve 12 and the other end of the coil spring 19 is secured to the inner circumferential surface of the spring barrel 11. The spring barrel 11 has one of its flat sides provided with a slot 20 therethrough extending from near the axis of said spring barrel to near its periphery and a pin 21 passes through the slot 20 and between the second from the outer convolution and the next inner convolution of the spring 19. Secured to the pin 21 at right angles thereto is a bifurcated arm 22 adapted to straddle the sleeve 12 and terminating in cam surface portions 23 adapted to be brought adjacent to the sleeve 12 when the pin 21 is carried toward the periphery of the spring barrel 11 by the uncoiling action of the spring 19.

A clutch member 24 is splined upon the sleeve 12 to slide longitudinally thereof and thereon but rotatable therewith. Another clutch member 25 is rotatably mounted upon the shaft 13 and adapted to be secured to said shaft or released therefrom by means of a set screw 26 provided with a milled head 27. As the cam surfaces 23 of the bifurcated arm 22 are drawn between the spring barrel 11 and the clutch member 24 the cam surfaces 23 force the clutch member 24 to slide upon the sleeve 12 and to engage with the clutch member 25. A spiral spring 28 surrounds the sleeve 12 and is interposed between the clutch members 24 and 25 to normally urge the clutch member 24 out of engagement.

The clutch member 24 is provided with a circumferential groove 29 in which a screw 30 is adapted to ride loosely. The screw 30, which has a milled head 31, is adapted to spiral through an internally threaded opening 32 in an arm 33 which is slidably and non-rotatably mounted in supports 34. The slidable arm 33 carries rack teeth 35 which engage with a pinion 36 mounted fixedly upon the stem 37 of a spring snap switch 38 adapted to open or close an electric circuit and to thus start or stop an electric motor which may be geared to the shaft 13. Since neither the switch nor the motor form any part of my invention, and since both are well known and fully understood devices, I will not illustrate or describe them further.

The clutch member 25 is supplied with a ratchet wheel 39 secured to or made integral therewith and rotatable therewith upon the shaft 13 when the set screw 26 is loosened and rotatable with the shaft 13 and clutch member 25 when the set screw 26 is set against the shaft 13. A collar 40 is fixed upon the shaft 13 to prevent longitudinal movement of the clutch member 25 and ratchet wheel 39 upon the shaft 13.

A pendulum 41 is swingably mounted upon the shaft 13 and held in position longitudinally of that shaft by the collar 40 and by another collar 42 which is fixed upon the shaft 13 upon the side of the pendulum 41 opposite from the collar 40. The pendulum 41 is provided with a weight 43 at its lower end and has a pawl 44 pivoted upon it by means of a pin 45, the said pawl being pressed into yieldable engagement with the ratchet wheel 39 by a spring 46 secured upon the pendulum 41 by a screw 47. The pawl 44 is provided with a notch or tooth 48 which is adapted to be engaged by a second pawl 49 pivoted upon the pendulum 41 by a pin 50 and adapted to thus hold the pawl 44 out of engagement with the ratchet wheel 39 when desired. The movements of the pawl 44 in normally passing over the teeth of the ratchet wheel 39 are not of sufficient extent to permit of the pawl 49 engaging the notch 48 and the pawl 49 will only so engage the notch 48 when the pawl 44 is pulled back somewhat further than normal by the user of this mechanism.

It should be added that the shaft 13 is rotatably mounted or journaled in the frame 51 of the mechanism and that the sleeve 12 is prevented from moving longitudinally in one direction upon the shaft 13 by the frame 51 and from movement in the opposite direction by pressure of the spiral spring 28.

When this mechanism is used in connection with a constantly rotating shaft 13, the set screw 26 is tightened against the shaft 13 so that the clutch member 25 is locked to the shaft 13 and the screw 30 is spiralled upward through the opening 32 in the arm 33 so that it will not ride in the groove 29. When so operating, the spring 19 will drive the spring barrel 11 and rotate it, becoming partially unwound in doing so. As this unwinding occurs, the expanding spring will force the pin 21 toward the periphery of the spring barrel 11 along the slot 20 and will draw the cam surfaces 23 of the bifurcated arm 22 between the spring barrel and the clutch member 24, forcing the clutch member 24 against the resistance of the spiral spring 28 into engagement with the clutch member 25. As the clutch member 25 is fast to the shaft 13 and rotating therewith, and as the clutch member 24 is splined upon the sleeve 12, this will cause the sleeve 12 to rotate with the shaft 13 and to wind the spring 19, the inner end of which is secured to the sleeve 12. As this winding of the spring 19 proceeds, the inner coils of the spring will be wound tight one after another and when the next to the outermost convolution is drawn toward the center it will carry the pin 21 with it along the slot 20 and this will move the cam surfaces 23 of the bifurcated arm 22 from between the spring barrel 11 and the clutch member 24 and will permit the spring 28 to force the clutch member 24 out of engagement with the clutch member 25, when the spring 19 will cease to be wound further. Thus, the spring 19 will be maintained in a sufficiently wound state at all times to permit it to rotate the spring barrel constantly.

In my drawings I have not shown the spring barrel 11 as geared to any mechanism which it is to drive, but it is obvious that it may readily be so geared and that there would never be any object in causing it to rotate except where it was desired to operate some mechanism thereby. Accordingly, it may be assumed that there is always some resistance being offered to the rotation of the spring barrel 11 and that it will not simply rotate with the shaft 13, as it would do if it had no resistance offered to its rotation.

When this mechanism is used in connection with a shaft 13 that is normally stationary but geared to an electric motor controlled as to starting and stopping by a snap switch 38, the set screw 26 is left in tightened position against the shaft 13 and the screw 30 is spiralled through the internally threaded opening 32 in the arm 33 until it projects into the circumferential groove 29 in the clutch member 24, riding easily therein. When the clutch member 24 is forced to slide into engagement with the clutch member 25 by the cam surfaces 23 of the bifurcated arm 22, it will also slide the arm 33 through the screw 30 and will cause the rack teeth 35 to rotate the pinion 36 and the switch stem 37, throwing the snap spring switch 38 and thus starting the motor to driving the shaft 13. When the spring 19 has become sufficiently wound to permit the clutch member 24 to be forced back out of engagement with the clutch member 25, this will carry the arm 33 back with it and will cause the rack 35 to rotate the pinion 36 on the switch stem 37 and to throw the switch 38 and stop the motor.

In both of the foregoing methods of operation of this winding mechanism the pendulum 41 is inoperative, as the pawl 44 is held out of engagement with the ratchet wheel 39 by means of the pawl 49. In cases, however, where this mechanism is being used upon a moving automobile, boat or other vehicle the swinging of the pendulum due to the rocking or swaying of the vehicle or to wave action upon the boat may be utilized for winding instead of the shaft 13, and may be so used whether the shaft 13 is in independent rotation or not.

When to be pendulum operated, the set screw 26 is loosened so that the clutch member 25 and associated ratchet wheel 39 are not locked to the shaft 13 but are rotatable thereon. The pawl 49 is disengaged from the notch 48 in the pawl 44 so that the spring 46 may press the pawl 44 into engagement with the ratchet wheel 39. Now, each swing of the pendulum 41 in one direction will rotate the clutch member 25, through the ratchet wheel 39, to an extent substantially equal to such swing in degrees, but will not be affected by the return swing of the pendulum because the pawl 44 will not then engage the ratchet wheel 39 operatively. It is obvious that such swinging will wind the spring 19 whenever the clutch members 24 and 25 are engaged, as they will be whenever the spring 19 requires winding, as heretofore fully explained.

I claim:

1. In spring winding mechanism, the combination of a member positioned between certain convolutions of a coiled spring, a cam member adapted to be operated by the said coiled spring through movement of the said first mentioned member by the said coiled spring, and a clutch member adapted to be moved into or out of operative position by the operation of the said cam member.

2. In spring winding mechanism, the combination of a rotatable spring barrel, a coiled spring having one of its ends secured to the said spring barrel and the other of its ends secured to a central rotatable member, an opening in the said spring barrel, a member projecting through the said opening and passing between certain convolutions of the said spring, a cam member secured for movement with the said last named member, and a clutch member splined upon the said central rotatable member and adapted to be moved into operative position by the said cam member and to be moved out of operative position whenever not held in such operative position by the said cam member.

3. In spring winding mechanism, the combination of a rotatable spring barrel, a coiled spring adapted to rotate said spring barrel, a clutch member, an element engaging with and adapted to be actuated by the coiling or uncoiling of said spring, and a cam member adapted to actuate said clutch member and to be actuated by the said element.

4. In spring winding mechanism, the combination of a coil spring, and a cam member engaging with and adapted to be actuated by the coiling or uncoiling of the said coil spring.

5. In spring winding mechanism, the combination of a spring barrel, a sleeve upon which said spring barrel is adapted to rotate, a coil spring having one of its ends secured to the said spring barrel and the other of its ends secured to the said sleeve, a clutch member splined upon the said sleeve, a shaft passing through the said sleeve and mounting said sleeve rotatably thereon, a clutch member adapted to be secured to said shaft for rotation therewith and to be engaged by the said clutch member splined upon the said sleeve, a spiral spring interposed between the said clutch members and adapted to normally urge the said splined clutch member out of engagement with the other said clutch member, and a cam member adapted to be drawn between the said spring barrel and the said splined clutch member by the uncoiling of the said coil spring in such manner as to cam the said splined clutch member into engagement with the other said clutch member and adapted to be withdrawn from between the said spring barrel and the said splined clutch member by the coiling of said coil spring.

6. In spring winding mechanism, the combination of a coil spring, a clutch member adapted to cause winding of the said spring when said clutch member is rotated in winding direction, a driven shaft, a second clutch member adapted to be secured to said driven shaft for rotation therewith, resilient means normally urging the two said clutch members out of engagement with each other, and a cam member adapted to be moved by the uncoiling of the said coil spring in such manner as to cam the said first named clutch member into engagement with the said second clutch member and to be moved by the coiling of said coil spring out of operative position.

7. In spring winding mechanism, the combination of a coil spring, a clutch member adapted to cause winding of the said spring when said clutch member is rotated in winding direction, a rotatable shaft, a second clutch member adapted to be secured to said rotatable shaft for rotation therewith, resilient means normally urging the two said clutch members out of engagement with each other, a cam member adapted to be moved by the uncoiling of the said coil spring in such manner as to cam the said first named clutch member into engagement with the said second clutch member and to be moved out of operative position by the coiling of the said coil spring, and a member adapted to be actuated by the movements into or out of engagement of the said first named clutch member and adapted to close an electric circuit when moved in one direction and to open the said circuit when moved in the opposite direction.

8. In spring winding mechanism, the combination of a coil spring, means for opening or closing an electric circuit, a cam member adapted to be actuated by the coiling or uncoiling of the said coil spring and to render the said coil spring windable or unwindable, and means actuated by the said cam member for actuating the said means for closing or opening an electric circuit.

9. In spring winding mechanism, the combination of a coil spring, a rotatable winding member having one end of said coil spring secured thereto, a member slidable longitudinally of and upon the said rotatable member, a cam member adapted to be actuated by the coiling or uncoiling of the said coil spring and to cam the said member slidable upon the said rotatable member in such manner as to cause the said member to slide in one direction upon said rotatable member or to slide in the opposite direction upon the said rotatable member under the urge of resilient means when the camming action of the said cam member is withdrawn, and means actuated by the sliding of said member slidable on the said rotatable member for opening or closing an electric circuit.

10. In spring winding mechanism, the combination of a coil spring, a cam member adapted to be actuated by the coiling or uncoiling of the said coil spring, rotatable winding means for the said coil spring, continuously operating driving means and means actuated by the said cam member for rendering said rotatable winding means operable or inoperable by said driving means.

11. In spring winding mechanism, the combination of a coil spring, a cam member adapted to be acutated by the coiling or uncoiling of said coil spring, winding means for said coil spring, pendulum means adapted to drive said winding means, and means actuated by said cam member for rendering the said winding means operative or inoperative according to the degree to which the said coil spring is wound.

12. In spring winding mechanism, the combination of a coil spring, winding means therefor, a cam member, a rotatable shaft, and means operated by the uncoiling of the said coil spring beyond a given degree and adapted to so actuate the said cam member as to render the said rotatable shaft operative to drive the said winding means and operated by the coiling of the said coil spring beyond a given degree and adapted to so actuate the said cam member as to render the said rotatable shaft inoperative to drive the said winding means.

13. In spring winding mechanism, the combination of a coil spring, winding means therefor, a rotatable shaft, and a cam member engaging with and actuated by the uncoiling or coiling of the said coil spring beyond given degrees and adapted to render the said rotatable shaft operative or inoperative to drive the said winding means.

14. In spring winding mechanism, the combination of a spring barrel, a rotatable shaft, a sleeve rotatably mounted upon the said shaft and rotatably mounting the said spring barrel, a coil spring having its inner end secured to the said sleeve and its outer end secured to the said spring barrel, a ratchet wheel fixed upon the said sleeve, a pawl pivoted upon the said spring barrel and adapted to engage the said ratchet wheel to prevent rotation of the said sleeve in a non-winding direction, a clutch member splined upon the said sleeve and provided with a circumferential groove, a second clutch member adapted to be locked to the said rotatable shaft for rotation therewith, a spiral spring interposed between the said clutch members and normally urging them apart, a cam member movable by the said coil spring and adapted to force the said first named clutch member into engagement with the said second clutch member whenever the said coil spring becomes unwound beyond a given degree and to permit the said first named clutch member to be forced out of engagement with the said second clutch member by the said spiral spring whenever the said coil spring becomes wound beyond a given degree, a slidably mounted member carrying a screw adapted to be adjusted to have its end ride within the said groove in the said first named clutch member, and rack teeth carried by said slidably mounted member and adapted to engage with a pinion fixed upon the stem of an electrical switch.

15. In spring winding mechanism, the combination of a spring barrel, a rotatable shaft, a sleeve rotatably mounted upon said shaft and rotatably mounting the said spring barrel, a coil spring having its inner end secured to the said sleeve and its outer end secured to the said spring barrel, means adapted to prevent the said sleeve from rotating in a non-winding direction, a clutch member splined upon the said sleeve, a second clutch member adapted to be freely rotatable upon the said shaft but having no longitudinal freedom of movement thereon, resilient means normally urging the two said clutch members apart, a ratchet wheel secured to the said second clutch member and rotatable upon the said shaft therewith, a cam member movable into operative position by the unwinding of the said coil spring beyond a given degree and out of operative position by the winding of the said coil spring beyond a given degree and adapted to force the said first named clutch member into mesh with the said second clutch member when in operative position, a pendulum adapted to swing upon the said rotatable shaft but not rotatable with said shaft, a pawl carried by said pendulum and adapted to engage the said ratchet wheel secured to the said second clutch member, and means for holding the said pawl out of engagement with the said ratchet wheel when desired.

CHARLES H. GILL.